June 19, 1934.   C. V. JONES   1,963,851
COTTON CHOPPER AND CULTIVATOR
Filed Oct. 24, 1933
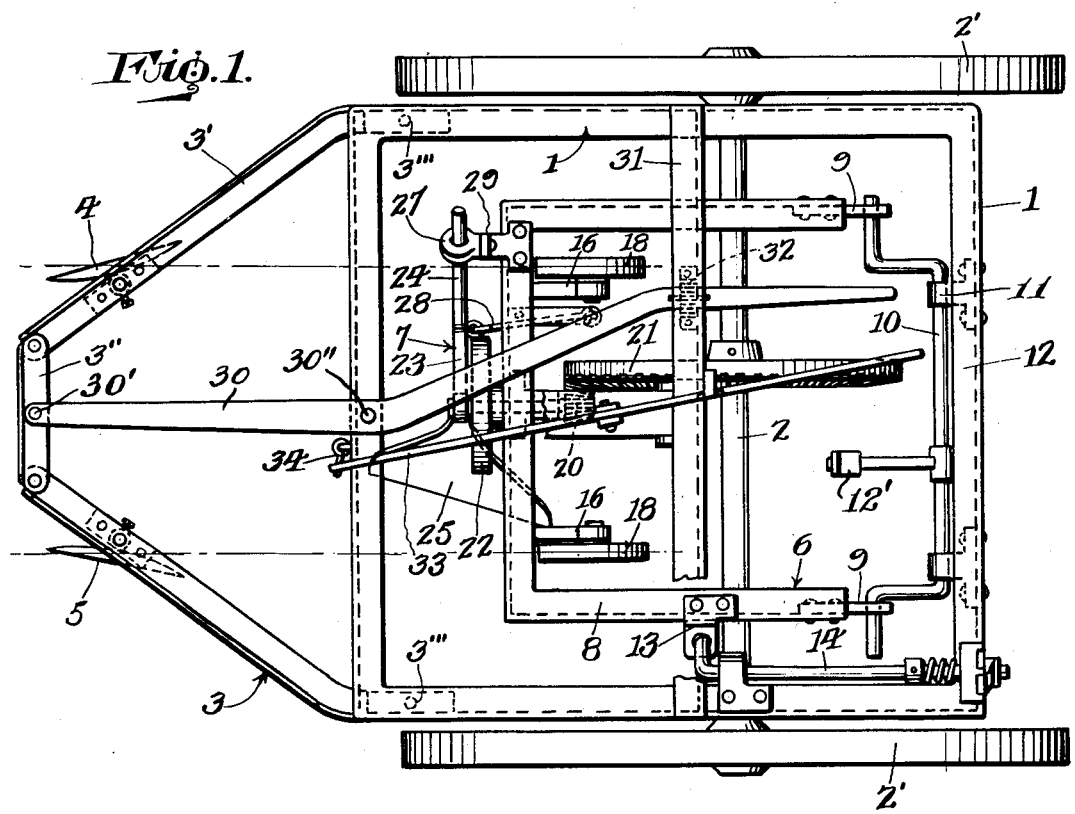
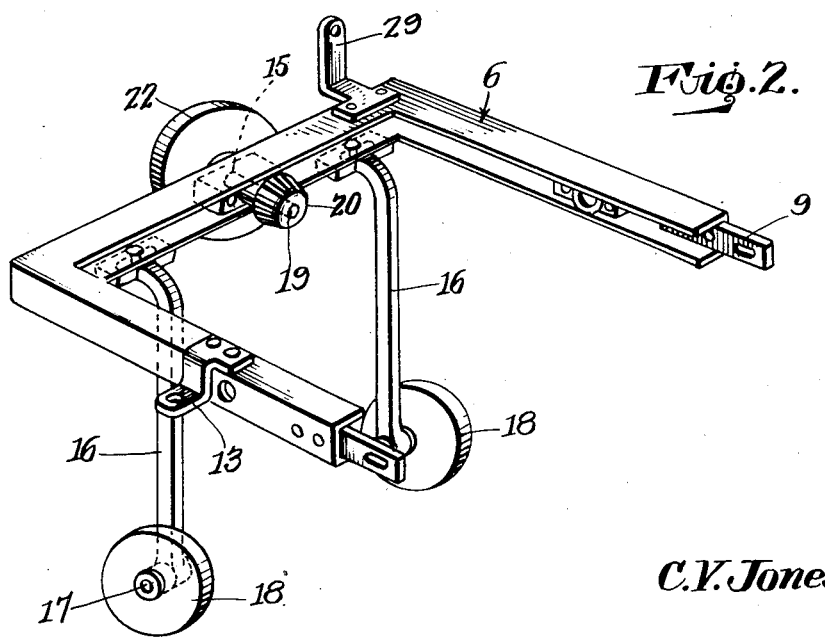
Inventor
C. V. Jones
By Geo. P. Kimmel
Attorney Patented June 19, 1934

1,963,851

UNITED STATES PATENT OFFICE 1,963,851

COTTON CHOPPER AND CULTIVATOR

Claudius V. Jones, Jackson, Miss.

Application October 24, 1933, Serial No. 695,024

4 Claims. (Cl. 97—13)

This invention relates to a cotton chopper and cultivator, and is an improvement upon the machine forming the subject of Letters Patent No. 1,899,806 granted to me February 28, 1933, and not only embodies the advantages set forth by the patent aforesaid, but has for its further object to provide means traveling upon the ground rearwardly of the cultivating means for the purpose of automatically regulating the depth where the chopping operation of the machine is carried out whereby the plants will be chopped at uniform points.

A further object of the invention is to provide, in a manner as hereinafter set forth, a machine of the class referred to including a plurality of spaced sidewise opposed cultivating elements and gauging elements rearwardly of and traveling in the path of the cultivating elements for automatically gauging the depth where the chopping operation of the chopper mechanism of the machine is performed.

A further object of the invention is to provide, in a manner as hereinafter set forth, a machine of the class referred to including a pivotally supported tiltable depth gauging structure for traveling upon the ground carrying a chopper mechanism and with said structure providing during the travel of the machine for automatically controlling the depth where the chopping operation of the chopper mechanism is carried out.

A further object of the invention is to provide, in a manner as hereinafter set forth, a machine of the class referred to including a horizontally disposed pivotally supported tiltable frame carrying a chopper structure and the frame provided with means depending therefrom, traveling upon the ground, aligning with cultivating elements forming a part of the machine and providing on the travel of the machine for automatically gauging the depth where the chopping operation of the chopper structure is performed.

A further object of the invention is to provide, in a machine of the class referred to, a pivotally supported tiltable chopper regulating structure for automatically elevating and lowering the chopper during the travel of the machine for automatically controlling the depth where the chopper performs its operation resulting in the plants being chopped at uniform points.

To the above ends essentially and to others which may hereinafter appear, the invention consists of such parts, and such combination of parts which fall within the scope of the invention as claimed.

In the drawing:

Figure 1 is a top plan view of the machine.

Figure 2 is a perspective view of the tiltable frame.

The drawing illustrates a mobile supporting frame 1 pivotally mounted on a rotatable axle 2 provided with traction wheels 2'. Arranged below and pivotally supported from and extending forwardly from the forward end of frame 1 is an auxiliary tapered adjustable frame 3, having arranged therebelow and connected therewith a pair of opposed spaced adjustable cultivating elements 4, 5 of disc-like form. The frame 3 consists of a pair of oppositely disposed inclined side sections 3' and a front section 3" arranged between and pivotally connected at its ends to the forward ends of the sections 3". The rear ends of sections 3' are pivoted as at 3''' with frame 1.

Pivotally mounted upon the axle 2 is a controlling structure 6 for automatically guaging the depth where the chopping operation of a chopping mechanism 7 is performed. The mechanism 7 is carried by the structure 6, and the latter consists of a tiltable frame 8 pivotally and slidably mounted on axle 2. The frame 8 is of yoke-shape contour and open at its rear end. Frame 8 has extending rearwardly from its sides a pair of slotted bars 9. In the slots of bars 9 are slidably mounted the angle-shaped sides of a forwardly extending combined coupling and shifting yoke 10 for frame 8. The yoke has its base pivotally connected as at 11 to the front of the rear frame member 12 of the frame 1. The yoke 10 carries a foot operated lever 12' for the purpose of shifting the sides of yoke 10 downwardly to tilt frame 8 in a manner to have its front end move upwardly and carry mechanism 7 therewith for clearing obstructions. Attached to one side of frame 8 is a laterally extending slotted bracket 13 and in the slot of the latter is slidably engaged the angle-shaped forward end of a spring controlled lever operated shifting and latching mechanism 14 for moving the frame 8 laterally upon and latching it in adjusted position on axle 2. The mechanism 14 is secured to and extended forwardly from the frame member 12. The forward end of frame 8, at a point in alignment with the longitudinal medium of the machine is formed with an opening 15. Depending from and adjustably secured to the forward end of frame 8 is a pair of hangers 16 provided at their lower ends with stub shafts or pins 17 upon which are revolubly mounted guaging rollers 18 which travel in the furrows made by the cultivating elements 4, 5. The frame 8 will bodily carry mechanism 7 therewith and control the latter in a manner whereby the depth of the point where the said mechanism performs the chopping operation is gauged. The adjustment of frame 8 by rollers 18 will cause the plants to be chopped off at uniform points.

The chopping mechanism 7 is of the same form, arrangement, construction, purpose, operation and conforms in detail to such mechanism as disclosed in my patent aforesaid, with the exception of the arrangement of its drive. The chopping mechanism 7 includes a tapered pinion 19 carried on the shaft 20 which is journaled in opening 15 of frame 6. The pinion 19 meshes with a crown gear 21 fixed to axle 2. The shifting of frame 6 moves pinion 18 into mesh with gear 21. The meshing of pinion 19 and gear 21 is maintained during the operation of the machine. The shifted position of frame 6 is as shown in Figure 1. The gear 21 is driven from axle 2.

With respect to the chopping mechanism as shown in my patent aforesaid, it includes a disc 22 on the forward end of shaft 20. Eccentrically connected to disc 22 is an arm 23 extending transversely of the machine at a right angle to the shank 24 of the chopper or hoe member 25. The latter is secured to the lower end of shank 24, and as shown in my patent aforesaid, the hoe member 25 is at an upward inclination and at an angle to the longitudinal and transverse medians of the machine and the shank 24 at an inclination with respect to frame 6. The shank 24 extends through a swivel connection 27 carried by a bracket 29 at the front of frame 6. A retaining bar 28 is attached to shank 24. It is thought unnecessary to go into full details with respect to mechanism 7 as it is identical to that shown in the patent aforesaid. It will be stated, however, that the number of plants chopped will depend upon the length of the hoe. The adjusting of frame 3, which carries the cultivator elements relative to the frame 1 is had through the medium of a lever 30 pivotally connected to the section 3″ of the frame 3 as at 30′ and pivotally connected as at 30″ to the front of frame 1. The lever has a raised rear portion which passes through a support 31 extending upwardly from frame 1.

The support 31 is formed with a rack 32 for latching lever 30 in set position. The frame 1 may be tilted upon axle 2 by a lever and pull member 33, 34 respectively, the former being pivoted intermediate its ends upon the beam 6. The pull member 34 extends from the forward end of lever 33 and is connected to the front of frame 1. The construction referred to is more clearly shown in my patent aforesaid.

What I claim is:—

1. In a combined cotton chopper and cultivator, a rotatable axle, a horizontally disposed main frame pivotally mounted intermediate its ends upon said axle, a horizontally disposed yoke like-member arranged within said main frame, pivotally supported intermediate its ends upon said axle and loosely suspended at its rear end with the rear end of said main frame, a chopper mechanism carried by, bodily movable with and extended forwardly from said member, said mechanism being operated from said axle, hangers depending from said member, and ground traveling gauge wheels carried by the hangers rearwardly of the chopper mechanism for gauging the depth where the chopping operation is performed to provide for the chopping of the plants at uniform points.

2. In a combined cotton chopper and cultivator, a rotatable axle, a horizontally disposed main frame pivotally mounted intermediate its ends upon said axle, a horizontally disposed yoke shape member within said frame and having its forward end closed, said member being pivotally supported intermediate the ends of its sides upon said axle, means for slidably connecting the rear ends of the sides of said member to the rear end of said frame and for controlling the lateral position of said member, a chopper mechanism carried by the forward end of and bodily movable with said member, said mechanism extended forward from said end of said member and being operated from said axle, hangers depending from said forward end, and gauge wheels carried by the lower ends of the hangers rearwardly of said mechanism for gauging the depth where the chopping operation is performed to provide for the chopping of the plants at uniform points.

3. In a combined cotton chopper and cultivating machine, a combined chopping mechanism supporting and gauge structure for gauging the depth where the chopping operation of the chopping mechanism is performed to provide for the chopping of the plants at uinform points, said mechanism including a horizontally disposed yoke-shape member having its forward end closed, the sides of said member intermediate their end having parallel openings for pivotally mounting upon a support, the rear end of the sides of said member having slotted extensions for slidably connecting therewith a pivotal connection therefor, the forward end of said structure having spaced means for connecting the chopping mechanism therewith, hangers depending from said forward end, and gauge wheels rotatably supported at the lower ends of the hangers.

4. In a combined cotton chopper and cultivating machine, a combined chopping mechanism supporting and gauge structure for gauging the depth where the chopping operation of the chopping mechanism is performed to provide for the chopping of the plants at uniform points, said mechanism including a horizontally disposed yoke-shape member having its forward end closed, the sides of said member intermediate their end having parallel openings for pivotally mounting upon a support, the rear end of the sides of said member having slotted extensions for slidably connecting therewith a pivotal connection therefor, the forward end of said structure having spaced means for connecting the chopping mechanism therewith, hangers depending from said forward end, and gauge wheels rotatably supported at the lower ends of the hangers, said hangers having forwardly extending upper end portions anchored to said forward end, and said wheels being arranged on the outer sides of said hangers.

CLAUDIUS V. JONES.